(12) United States Patent
Jia et al.

(10) Patent No.: US 11,729,829 B2
(45) Date of Patent: Aug. 15, 2023

(54) COMMUNICATION METHOD AND TRANSMIT END DEVICE WITH LISTENING CAPABILITY

(71) Applicant: Huawei Technologies Co., Ltd., Shenzhen (CN)

(72) Inventors: Qiong Jia, Shanghai (CN); Jun Zhu, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 17/941,784

(22) Filed: Sep. 9, 2022

(65) Prior Publication Data
US 2023/0077145 A1 Mar. 9, 2023

Related U.S. Application Data

(63) Continuation of application No. 16/656,282, filed on Oct. 17, 2019, now Pat. No. 11,457,473, which is a
(Continued)

(30) Foreign Application Priority Data

Apr. 17, 2017 (CN) .......................... 201710250043.9

(51) Int. Cl.
*H04W 74/08* (2009.01)
*H04W 16/14* (2009.01)

(52) U.S. Cl.
CPC ........ *H04W 74/0808* (2013.01); *H04W 16/14* (2013.01)

(58) Field of Classification Search
None
See application file for complete search history.

(56) References Cited

U.S. PATENT DOCUMENTS

| 9,326,157 B1 | 4/2016 | Bhorkar et al. |
| 2007/0026868 A1* | 2/2007 | Schulz ................ H04M 3/367 455/454 |

(Continued)

FOREIGN PATENT DOCUMENTS

| CN | 105592467 A | 5/2016 |
| CN | 106358315 A | 1/2017 |

(Continued)

OTHER PUBLICATIONS

"Discussion on the UL LBT for LAA," 3GPP TSG RAN WG1 Meeting #85, Nanjing, China, R1-164603, XP051096884, pp. 1-10, 3rd Generation Partnership Project, Valbonne, France (May 23-27, 2016).

(Continued)

*Primary Examiner* — Anh Ngoc M Nguyen
(74) *Attorney, Agent, or Firm* — Leydig, Voit & Mayer, Ltd.

(57) ABSTRACT

This application discloses a communication method. The method includes: comparing, by a second transmit end device, a second bandwidth carrying at least one second service transmission and a first bandwidth, wherein the first bandwidth is used by a first transmit end device within a first specified time period on an unlicensed frequency band to complete first service transmission, the at least one second service transmission started in a remaining time period of the first specified time period after the first service transmission is completed; performing channel listening on the second bandwidth based on a result of the comparison; and performing, by the second transmit end device, the second service transmission on the second bandwidth if the second bandwidth is found to be in an idle state. In addition, a corresponding transmit end device is disclosed. This appli- (Continued)

cation discloses a channel listening mechanism applicable to a flexible-bandwidth scenario.

20 Claims, 9 Drawing Sheets

Related U.S. Application Data continuation of application No. PCT/CN2018/083347, filed on Apr. 17, 2018.

(56) References Cited

U.S. PATENT DOCUMENTS

| | | | |
|---|---|---|---|
| 2007/0223508 A1* | 9/2007 | Nandagopalan | H04W 16/14 370/437 |
| 2016/0135055 A1 | 5/2016 | Bhorkar et al. | |
| 2016/0165601 A1 | 6/2016 | Noh et al. | |
| 2016/0337177 A1* | 11/2016 | Lindoff | H04W 24/02 |
| 2017/0238233 A1 | 8/2017 | Oh et al. | |

FOREIGN PATENT DOCUMENTS

| | | |
|---|---|---|
| CN | 106470502 A | 3/2017 |
| EP | 3005820 B1 | 7/2019 |
| WO | 2014190290 A1 | 11/2014 |

OTHER PUBLICATIONS

"Channel Access for LAA UL," 3GPP TSG RAN WG1 Meeting #84bis, Busan, South Korea, R1-162920, XP051080412, pp. 1-9, 3rd Generation Partnership Project, Valbonne, France (Apr. 11-15, 2016).

CN/201710250043.9, Office Action and Search Report, dated Apr. 15, 2023.

U.S. Appl. No. 16/656,282, filed Oct. 17, 2019, Patented.

* cited by examiner

After a first transmit end device obtains a first bandwidth usable within a first specified time period through contention and completes first service transmission in the first specified time period, in respect of at least one second service transmission started in the remaining time period of the first specified time period, a second transmit end device compares magnitudes of a second bandwidth carrying the second service transmission and the first bandwidth — S101

The second transmit end device uses a corresponding channel listening mechanism based on a result of the comparison to perform channel listening on the second bandwidth — S102

The second transmit end device performs the second service transmission on the second bandwidth if the second bandwidth is found to be in an idle state — S103

FIG. 2

COMMUNICATION METHOD AND TRANSMIT END DEVICE WITH LISTENING CAPABILITY

CROSS-REFERENCE TO RELATED APPLICATIONS

This application is a continuation of U.S. patent application Ser. No. 16/656,282, filed on Oct. 17, 2019, which is a continuation of International Application No. PCT/CN2018/083347, filed on Apr. 17, 2018. The International Application claims priority to Chinese Patent Application No. 201710250043.9, filed on Apr. 17, 2017. All of the aforementioned patent applications are hereby incorporated by reference in their entireties.

TECHNICAL FIELD

The present disclosure relates to the field of communications technologies, and in particular, to a communication method and a transmit end device.

BACKGROUND

Rapid development of wireless communications technologies leads to an increasing shortage of spectrum resources, driving exploration on unlicensed frequency bands. A next-generation mobile communications system, for example, a 5th generation mobile communications system, needs to support a huge growth of mobile data traffic. Therefore, use of unlicensed spectrum resources is of great attraction to next-generation mobile communications (for example, new radio (NR)). Since there is no need to purchase the right of using unlicensed frequency bands, transmit end devices can use these spectra as needed, provided that these unlicensed frequency bands can be used fairly among the transmit end devices. Channel listening means determining, by listening to signal power on a channel, whether the channel is occupied, and is an effective way to ensure that unlicensed frequency bands are used fairly.

In a licensed assisted access (LAA) or an enhanced licensed-assisted access (eLAA) system, a system bandwidth is fixed in a transmission process. Before performing transmission, a transmit end device needs to first perform channel listening on a corresponding system bandwidth, and can perform transmission only when the transmit end device detects that a corresponding spectrum is idle.

However, all existing channel listening mechanisms are applicable to fixed bandwidths, and up till now, no clear and effective solution is yet available for a flexible-bandwidth scenario in next-generation mobile communications. Therefore, it is urgent to provide a channel listening mechanism applicable to a flexible-bandwidth scenario to improve communication efficiency.

SUMMARY

This application provides a communication method and a transmit end device, to implement channel listening in a flexible-bandwidth scenario, so as to improve communication efficiency.

A first aspect of this application provides a communication method, including: after a first transmit end device obtains a first bandwidth usable within a first specified time period from an unlicensed frequency band through contention and completes first service transmission in the first specified time period, in respect of at least one second service transmission started in a remaining time period of the first specified time period, comparing, by a second transmit end device, magnitudes of a second bandwidth carrying the second service transmission and the first bandwidth; using, by the second transmit end device, a corresponding channel listening mechanism based on a result of the comparison to perform channel listening on the second bandwidth; and performing, by the second transmit end device, the second service transmission on the second bandwidth if the second bandwidth is found to be in an idle state. This application discloses a channel listening mechanism applicable to a flexible-bandwidth scenario is disclosed. Corresponding channel listening mechanisms may be used depending on different bandwidths, thereby improving communication efficiency.

In an embodiment, the using, by the second transmit end device, a corresponding channel listening mechanism based on a result of the comparison to perform channel listening on the second bandwidth includes: if the result of the comparison is that the second bandwidth is less than or equal to the first bandwidth, performing, by the second transmit end device, listening by using a non-random backoff based channel listening mechanism to determine whether the second bandwidth is in an idle state. In this embodiment, channel listening may be implemented quickly by using the non-random backoff based channel listening mechanism.

In another embodiment, the method further includes: in respect of the at least one second service transmission started in the remaining time period of the first specified time period, comparing, by the second transmit end device, whether the second bandwidth carrying the second service transmission is less than or equal to a third bandwidth carrying last discontinuous second service transmission preceding the second service transmission; if a result of the comparison is that the second bandwidth is less than or equal to the third bandwidth, performing, by the second transmit end device, listening by using a non-random backoff based channel listening mechanism to determine whether the second bandwidth is in an idle state; and performing, by the second transmit end device, the second service transmission on the second bandwidth if the second bandwidth is found to be in an idle state. In this embodiment, when the second bandwidth is less than or equal to the third bandwidth carrying last discontinuous second service transmission preceding the second service transmission, channel listening may be performed by using the non-random backoff based channel listening mechanism. In this way, channel listening in a flexible-bandwidth scenario can be flexibly and efficiently implemented.

In still another embodiment, the first specified time period is a first maximum channel occupancy time MCOT obtained by the first transmit end device on the first bandwidth, where the first MCOT includes a sum of transmission time periods of all service transmission started on the first bandwidth, or the first MCOT includes a sum of transmission time periods of all service transmission started on the first bandwidth and time intervals of all discontinuous service transmission, or the first MCOT includes a sum of transmission time periods of all service transmission started on the first bandwidth and a time interval of discontinuous service transmission satisfying a specified condition. In this embodiment, an effective channel occupancy time of the first transmit end device on the first bandwidth is specified. If the effective time expires, listening on the first bandwidth needs to be performed again by using a random backoff based channel listening mechanism to obtain a new effective channel occupancy time.

In still another embodiment, the using, by the second transmit end device, a corresponding channel listening mechanism based on a result of the comparison to perform channel listening on the second bandwidth includes: if the result of the comparison is that the second bandwidth is greater than the first bandwidth, performing, by the second transmit end device, listening by using a random backoff based channel listening mechanism to determine whether the second bandwidth is in an idle state; and the performing, by the second transmit end device, the second service transmission on the second bandwidth if the second bandwidth is found to be in an idle state includes: performing, by the second transmit end device, the second service transmission on the second bandwidth in a second specified time period if the second bandwidth is found to be in an idle state, where the second specified time period is a second MCOT obtained by the second transmit end device on the second bandwidth, where the second MCOT includes a sum of transmission time periods of all service transmission started on the second bandwidth, or the second MCOT includes a sum of transmission time periods of all service transmission started on the second bandwidth and time intervals of all discontinuous service transmission, or the second MCOT includes a sum of transmission time periods of all service transmission started on the second bandwidth and a time interval of discontinuous service transmission satisfying a specified condition. In this embodiment, when the second bandwidth is greater than the first bandwidth, listening on the second bandwidth needs to be performed by using the random backoff based channel listening mechanism.

In still another embodiment, the method further includes: if the result of the comparison is that the second bandwidth is greater than the first bandwidth, performing, by the second transmit end device, listening by using a non-random backoff based channel listening mechanism to determine whether the first bandwidth is in an idle state, and performing listening by using a random backoff based channel listening mechanism to determine whether a remainder fourth bandwidth is in an idle state, where the fourth bandwidth is a difference between the second bandwidth and the first bandwidth; and performing, by the second transmit end device, the second service transmission on the second bandwidth if both the first bandwidth and the fourth bandwidth are found to be in an idle state. In this embodiment, when the second bandwidth is greater than the first bandwidth, listening may be performed by using the non-random backoff based channel listening mechanism to determine whether the first bandwidth is in an idle state, and listening may be performed by using the random backoff based channel listening mechanism to determine whether the remainder fourth bandwidth is in an idle state. In this way, channel listening in a flexible-bandwidth scenario can be flexibly and efficiently implemented.

In still another embodiment, the first service transmission includes at least one of the following types: uplink service transmission and downlink service transmission; and the plurality of times of discontinuous second service transmission include at least one of the following types: uplink service transmission and downlink service transmission.

In still another embodiment, a length of a contention window of the random backoff based channel listening mechanism is fixed or variable.

Another aspect of this application provides a transmit end device. The transmit end device has a function of implementing actions of the transmit end device in the foregoing method. The function may be implemented by hardware, or may be implemented by hardware by executing corresponding software. The hardware or software includes one or more modules corresponding to the foregoing function.

In a embodiment, the transmit end device includes: a comparison unit, configured to: after a first transmit end device obtains a first bandwidth usable within a first specified time period from an unlicensed frequency band through contention and completes first service transmission in the first specified time period, in respect of at least one second service transmission started in the remaining time period of the first specified time period, compare magnitudes of a second bandwidth carrying the second service transmission and the first bandwidth; a listening unit, configured to use a corresponding channel listening mechanism based on a comparison result of the comparison unit to perform channel listening on the second bandwidth; and a transmission unit, configured to perform the second service transmission on the second bandwidth if the listening unit finds that the second bandwidth is in an idle state.

In another embodiment, the transmit end device includes a receiver, a transmitter, a memory, and a processor. The memory stores a group of program code, and the processor is configured to invoke the program code stored in the memory to perform the following operations: after a first transmit end device obtains a first bandwidth usable within a first specified time period from an unlicensed frequency band through contention and completes first service transmission in the first specified time period, in respect of at least one second service transmission started in the remaining time period of the first specified time period, comparing magnitudes of a second bandwidth carrying the second service transmission and the first bandwidth; using a corresponding channel listening mechanism based on a result of the comparison to perform channel listening on the second bandwidth; and performing, by the second transmit end device, the second service transmission on the second bandwidth if the second bandwidth is found to be in an idle state.

Based on a same disclosure idea, for a principle for resolving a problem by the apparatus and beneficial effects of the apparatus, reference may be made to each embodiment of the method performed by the foregoing transmit end device and beneficial effects brought by them. Therefore, for implementation of the apparatus, refer to implementation of the method, and repeated content is not described herein again.

Still another aspect of this application provides a computer-readable storage medium. The computer-readable storage medium stores an instruction, and when the instruction is run on a computer, the computer is enabled to perform the methods described in the foregoing aspects.

Still another aspect of this application provides a computer program product including an instruction. When the instruction is run on a computer, the computer is enabled to perform the methods described in the foregoing aspects.

BRIEF DESCRIPTION OF DRAWINGS

To describe the technical solutions in embodiments of the present disclosure or in the background more clearly, the following describes accompanying drawings required for describing the embodiments of the present disclosure or the background.

FIG. 2 is a schematic flowchart of a communication method according to an embodiment of the present disclosure;

DESCRIPTION OF EMBODIMENTS

The following describes the embodiments of the present disclosure with reference to the accompanying drawings in the embodiments of the present disclosure.

Figure 1:
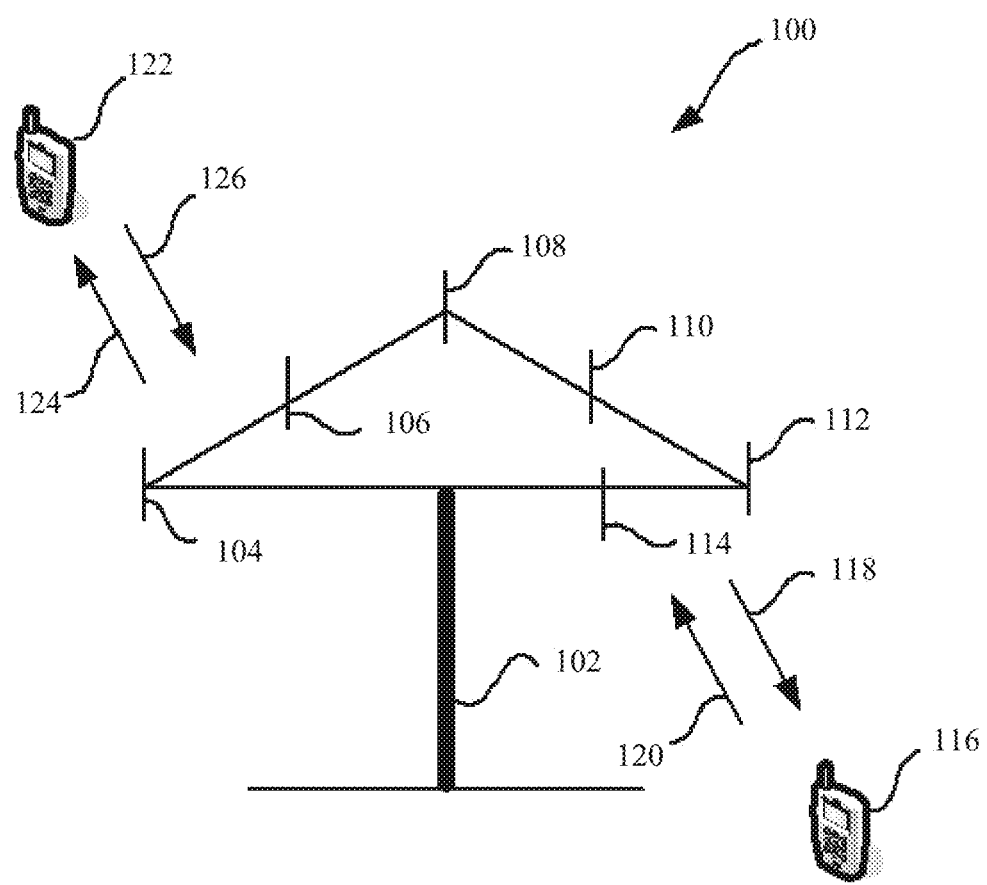
FIG. 1 is a schematic architectural diagram of a communications system according to an embodiment of the present disclosure.

FIG. 1 is a schematic architectural diagram of a communications system according to an embodiment of the present disclosure. The communications system includes a base station and a terminal device. The communications system may be a global system for mobile communications (GSM), a code division multiple access (CDMA) system, a wideband code division multiple access (WCDMA) system, a worldwide interoperability for microwave access (WiMAX) system, a long term evolution (LTE) system, a 5G communications system (for example, a new radio (NR) system), a communications system integrating a plurality of communications technologies (for example, a communications system integrating an LTE technology and an NR technology), or a subsequent evolved communications system.

The terminal device in this application is a device having a wireless communication function, and may be a handheld device, a vehicle-mounted device, a wearable device, or a computing device that has a wireless communication function, or another processing device connected to a wireless modem, or the like. Terminal devices in different networks may have different names. For example, the terminal device may be referred to as a user equipment (UE), an access terminal, a subscriber unit, a subscriber station, a mobile station, a mobile console, a remote station, a remote terminal, a mobile device, a user terminal, a terminal, a wireless communications device, a user agent or a user apparatus, a cellular phone, a cordless telephone set, a session initiation protocol (SIP) phone, a wireless local loop (WLL) station, a personal digital assistant (PDA), and a terminal device in a 5G network or a future evolved network.

The network device in this application is a device deployed in a radio access network to provide a wireless communication function, and the network device includes but is not limited to a base station (for example, a BTS, a NodeB (NB), an evolved NodeB (eNB or eNodeB), a transmission node in an NR system or a transmission reception point (TRP or TP), or a next-generation NodeB (gNB), and a base station or a network device in a future communications network), a relay node, an access point, a vehicle-mounted device, a wearable device, a wireless fidelity (Wi-Fi) site, a wireless backhaul node, a small cell, and a micro cell.

Specifically, in FIG. 1, a base station 102 may include a plurality of antenna groups. Each antenna group may include one or more antennas, for example, one antenna group may include antennas 104 and 106, and another antenna group may include antennas 108 and 110. In addition, an additional group may be included, and the additional group may include antennas 112 and 114. In high frequency communication, different antenna groups may constitute different antenna panels. For example, one antenna group forms a beam pointing to one direction, and another antenna group forms another beam pointing to another direction. To adapt to different device capabilities, more antennas may be required. Therefore, depending on different device capabilities, the additional groups may be provided with different quantities of antennas. For example, FIG. 1 shows a case in which each antenna group includes two antennas. However, there may be more or fewer antennas in each group. The base station 102 may additionally include a transmitter chain and a receiver chain. A person of ordinary skill in the art may understand that the transmitter chain and the receiver chain each may include a plurality of components related to signal transmission and reception, for example, a processor, a modulator, a multiplexer, a demodulator, a demultiplexer, or an antenna.

The base station 102 may communicate with one or more terminal devices, for example, a terminal device 116 and a terminal device 122. However, it may be understood that the base station 102 may communicate with any quantity of terminal devices similar to the terminal device 116 or 122. As shown in FIG. 1, the terminal device 116 communicates with the antennas 112 and 114, where the antennas 112 and 114 send information to the terminal device 116 through a forward link 118, and receive information from the terminal device 116 through a reverse link 120. In addition, the terminal device 122 communicates with the antennas 104 and 106, where the antennas 104 and 106 send information to the terminal device 122 through a forward link 124, and receive information from the terminal device 122 through a reverse link 126. In a frequency division duplex (FDD) system, for example, a frequency band used on the forward link 118 may be different from that used on the reverse link 120, and a frequency band used on the forward link 124 may be different from that used on the reverse link 126. In addition, in a time division duplex (TDD) system, a frequency band used on the forward link 118 may be the same as that used on the reverse link 120, and a frequency band used on the forward link 124 may be the same as that used on the reverse link 126.

A coverage area and/or transmission area of each group of antennas that are/is designed for communication are/is referred to as a sector of the base station 102. For example, an antenna group may be designed to communicate with a terminal device in a sector, namely, a coverage area, of the base station 102. When the base station 102 communicates with terminal devices 116 and 122 through the forward links 118 and 124 respectively, transmit antennas of the base station 102 can increase signal-to-noise ratios of the forward links 118 and 124 through beamforming. In addition, compared with a manner in which the base station 102 uses a single antenna to send a signal to all access terminal devices served by the base station, in a manner in which the base station 102 sends, through beamforming, a signal to the terminal devices 116 and 122 randomly scattered in a related coverage area, a mobile node in a neighboring cell receives less interference.

Within a given time period, the base station 102, the terminal device 116, or the terminal device 122 may be a wireless communications transmission device and/or a wireless communications receiving device. When sending data, the wireless communications transmission device may encode the data for transmission. For example, the wireless communications transmission device may obtain, for example, by generating, by receiving from another communications device, or by storing in a memory, a specific quantity of data bits to be transmitted to a wireless communications receiving device through a channel. Such data bits may be included in one or more transmission blocks of the data, and the transmission block may be segmented to generate a plurality of code blocks.

The embodiments of the present disclosure provide a communication method and a transmit end device. A first transmit end device obtains a first bandwidth usable within a specified time period through contention, and in respect of at least one second service transmission started in the remaining time period of the specified time period, a second transmit end device compares magnitudes of a second bandwidth carrying the second service transmission and the first bandwidth, and uses a corresponding channel listening mechanism based on a result of the comparison to perform channel listening on the second bandwidth, to perform the second service transmission. In this way, corresponding channel listening mechanisms may be used depending on different bandwidths, thereby improving communication efficiency.

In the embodiments of the present disclosure, the transmit end device may be a network device or a terminal device. In other words, if a network device transmits a beam on an unlicensed frequency band, the network device performs channel listening; or if a terminal device transmits a beam on an unlicensed frequency band, the terminal device performs channel listening.

In different communications systems, channel listening may have different names, for example, in the 3rd generation partnership project (3GPP) or in 5th generation mobile communications, channel listening is referred to as listen before talk (LBT). LBT means that a node that needs to transmit data first performs listening to determine whether there is a carrier or a signal on a medium to determine whether another node is transmitting data. If the medium is idle, the node can transmit data; or if the medium is not idle, the node performs backoff based channel listening again. For another example, in Wi-Fi communication, channel listening is implemented through clear channel assessment (CCA). CCA means that to effectively avoid a collision, a node must be able to accurately determine whether a channel is idle, when signal power received on the channel exceeds a specific threshold, it is considered that another node is performing communication on the listened channel. In this case, the node does not perform communication, so as to avoid interference and a collision, and avoid a case in which data transmission reliability and data transmission efficiency cannot be ensured.

For different application scenarios, the foregoing channel listening mechanisms may include four categories: Cat 1: no channel listening and detection is performed before data transmission; Cat 2: no random backoff based channel listening mechanism is performed; Cat 3: a random backoff based channel listening mechanism with a fixed contention window; and Cat 4: a random backoff based channel listening mechanism with a variable contention window. The foregoing four channel listening mechanisms are used as examples for description. A channel listening mechanism used in the embodiments of the present disclosure is not limited thereto.

The communication method provided in the embodiments of this application is applicable to both types of communication. The following first uses LBT as an example for description.

FIG. 2 is a schematic flowchart of a communication method according to an embodiment of the present disclosure. The method may include the following steps:

S101. After a first transmit end device obtains a first bandwidth usable within a first specified time period from an unlicensed frequency band through contention and completes first service transmission in the first specified time period, in respect of at least one second service transmission started in a remaining time period of the first specified time period, a second transmit end device compares magnitudes of a second bandwidth carrying the second service transmission and the first bandwidth.

In this embodiment, the transmit end device may use bandwidths of different magnitudes for service transmission depending on service requirements. For service transmission in an unlicensed frequency band, channel listening needs to be performed before the service transmission.

The first transmit end device may use a non-random backoff based channel listening mechanism. The non-random backoff based channel listening mechanism is a fast channel listening mechanism. In other words, before performing transmission, the transmit end device ensures that in a specified time period (for example, 25 µs), a corresponding channel is idle, namely, the channel is not occupied. In Wi-Fi and 3GPP communications systems, a non-random backoff based listening mechanism similar to this type is referred to as "Cat. 2".

The first transmit end device may use a random backoff based channel listening mechanism. The random backoff based channel listening mechanism includes two types: a first type of random backoff based channel listening mechanism is a type of random backoff based listening mechanism with a fixed contention window (referred to as "type-1 random backoff" below for short), and in Wi-Fi and 3GPP communications systems, a random backoff based listening mechanism similar to this type is referred to as "Cat. 3"; and a second type of random backoff based channel listening mechanism is a random backoff based listening mechanism with a variable contention window (referred to as "type-2 random backoff" below for short), and in Wi-Fi and 3GPP communications systems, a random backoff based listening mechanism similar to this type is referred to as "Cat. 4". It should be noted that, the foregoing "Cat. 3" and "Cat. 4" are merely used as examples for description for ease of understanding and are not intended to limit a random backoff based channel listening mechanism in this embodiment.

The following first describes the type 2 random backoff in detail. Specifically, a transmit end device first needs to ensure that a detected channel is idle within a delay time $T_d$, and then starts to perform random backoff. After the backoff is ended, the transmit end device accesses the channel and obtains a corresponding channel occupancy time, namely, a first specified time period. Particularly, if a transmit end device successfully obtains a spectrum resource through the type 2 random backoff LBT, and there is still a remaining time period in the first specified time period after first service transmission is completed on a corresponding spectrum, the transmit end device may share an occupied channel to another transmit end device for second service transmission in the remaining time period of the first specified time period. For example, there may be one or more other transmit end devices, and the second service transmission may include one service or a plurality of discontinuous services. In other words, if there is still a remaining time period in the first specified time period after the first service transmission is completed, at least one second service transmission may be started; and if the remaining time period is sufficient, a plurality of times of second service transmission may be performed. In this embodiment of the present disclosure, the first specified time period is a maximum channel occupancy time (MCOT) obtained by the first transmit end device on the first bandwidth. For example, to define the MCOT, one way is that the MCOT includes a sum of transmission time periods of all service transmission started on the first bandwidth (namely, time intervals between discontinuous service transmission are not included in the MCOT); another way is that the MCOT includes a sum of transmission time periods of all service transmission started on the first bandwidth and all time intervals between discontinuous transmissions; and a third way is that the MCOT includes a sum of transmission time periods of all service transmission started on the first bandwidth and some transmission time intervals (namely, a transmission interval satisfying a specified condition is included in the MCOT, for example, a time interval less than or greater than a threshold, or a time interval between discontinuous transmissions initiated by one transmit end device).

It should be noted that the first service transmission may be uplink service transmission or downlink service transmission, in other words, the first transmit end device may be a network device or a terminal device, and the second service transmission may also be uplink service transmission or downlink service transmission, and if the first transmit end device is a network device, the second service transmission may be downlink transmission of the first transmit end device, or may be uplink transmission of a terminal device served by the first transmit end device.

Therefore, after the first transmit end device obtains the first bandwidth usable within the first specified time period through contention and completes current service transmission of the first transmit end device (the first transmit end device obtains the first bandwidth through contention to perform the current service transmission) by using the first bandwidth in the first specified time period, if next service transmission needs to be performed, channel listening needs to be performed to obtain a resource. Usually, the next service transmission and the current service transmission are discontinuous. In an application scenario of flexible-bandwidth communication in an unlicensed frequency band, when the first transmit end device allows another transmit end device to perform second service transmission in the remaining time period of the first specified time period on a channel occupied by the first transmit end device, to ensure that any transmit end device can fairly contend for and efficiently use, in the remaining time period of the first specified time period, the shared channel provided by the first transmit end device, magnitudes of the second bandwidth occupied by second service transmission and the first bandwidth need to be compared, so as to select a channel listening mechanism used before the second service transmission.

S102. The second transmit end device uses a corresponding channel listening mechanism based on a result of the comparison to perform channel listening on the second bandwidth.

When the result of the comparison is that the second bandwidth is less than or equal to the first bandwidth (or may be that the second bandwidth is less than the first bandwidth), because before the second service transmission, the first transmit end device has obtained the first bandwidth usable within the first specified time period through contention, and channel listening for the second service transmission is started in the remaining time period of the first specified time period after the first service transmission is completed, if the second bandwidth is less than or equal to the first bandwidth (or the second bandwidth is less than the first bandwidth), only fast channel listening needs to be performed for the second service transmission to be performed on the second bandwidth. For example, a non-random backoff based channel listening mechanism is used. In other words, before performing transmission, the transmit end device needs to ensure that a corresponding spectrum is idle, namely, the spectrum is not occupied, in a specified time period (for example, 25 µs). This mechanism is similar to the "Cat. 2 LBT" mechanism in Wi-Fi and 3GPP communications systems.

When the second bandwidth is greater than the first bandwidth (or correspondingly, when the second bandwidth is greater than or equal to the first bandwidth), because the first transmit end device has not obtained a resource of a part, greater than the first bandwidth, in the second bandwidth through contention, a random backoff based channel listening mechanism may be used for channel listening, or a combination of a non-random backoff based channel listening mechanism and a random backoff based channel listening mechanism is used for channel listening.

S103. The second transmit end device performs the second service transmission on the second bandwidth if the second bandwidth is found to be in an idle state.

The second transmit end device can perform the second service transmission on the second bandwidth only when the second bandwidth is found to be in an idle state.

To sum up, in this embodiment, a corresponding channel listening mechanism may be used for a channel with a flexible bandwidth, thereby ensuring channel listening efficiency and reliability.

According to a channel listening method provided in this embodiment of the present disclosure, the first transmit end device obtains the first bandwidth usable within the specified time period through contention, and in respect of at least one second service transmission started in the remaining time period of the specified time period, the second transmit end device compares magnitudes of the second bandwidth carrying the second service transmission and the first bandwidth, and uses a corresponding channel listening mechanism based on a result of the comparison to perform channel listening on the second bandwidth, to perform the second service transmission. In this way, corresponding channel listening mechanisms may be used depending on different bandwidths, thereby improving communication efficiency.

Figure 3:
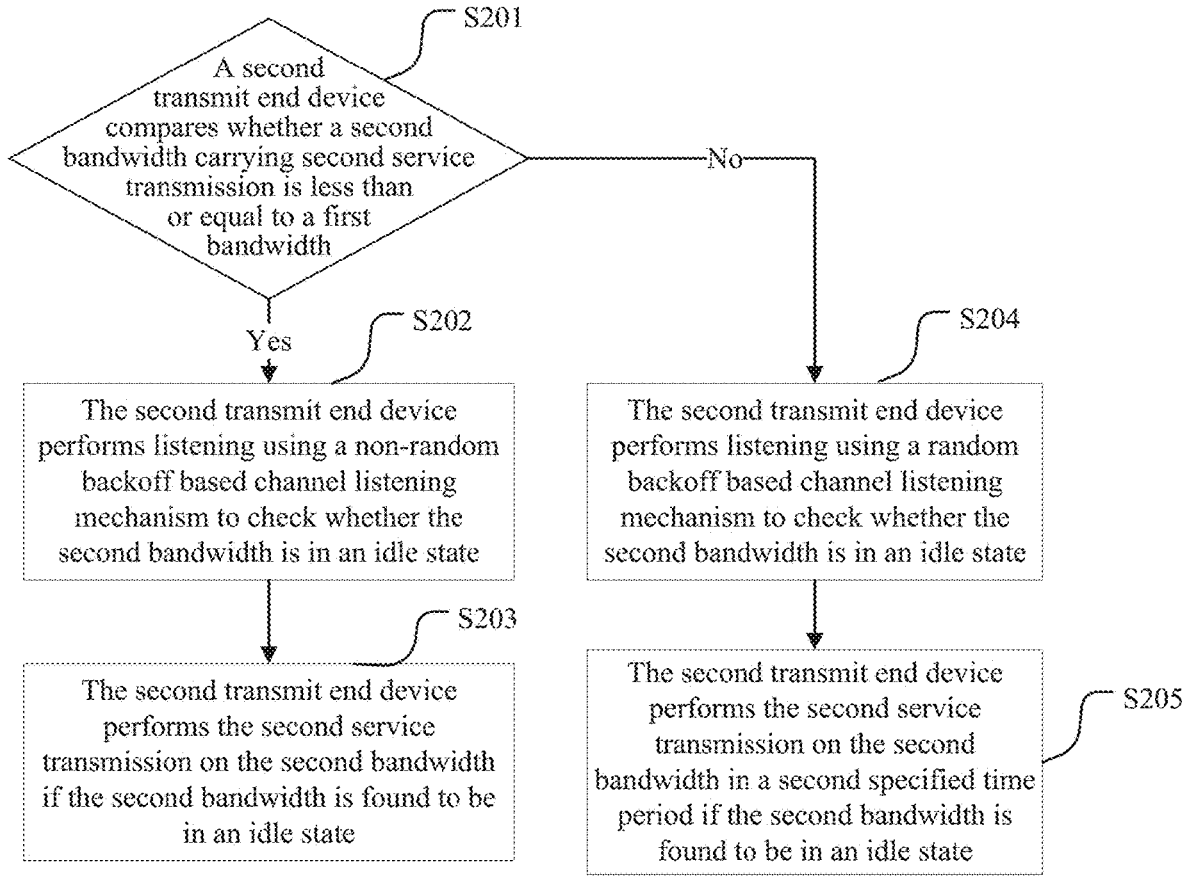
FIG. 3 is a schematic flowchart of a further detailed embodiment of the communication method provided in FIG. 2.

FIG. 3 is a schematic flowchart of a further detailed embodiment of a channel listening method provided in FIG. 2. The method may include the following steps:

S201. A second transmit end device compares whether a second bandwidth carrying second service transmission is less than or equal to a first bandwidth; and if the second bandwidth is less than or equal to the first bandwidth, perform step S202; or if the second bandwidth is greater than the first bandwidth, perform step S204.

S202. If a result of the comparison is that the second bandwidth is less than or equal to the first bandwidth, the second transmit end device performs listening by using a non-random backoff based channel listening mechanism to determine whether the second bandwidth is in an idle state.

S203. The second transmit end device performs the second service transmission on the second bandwidth if the second bandwidth is found to be in an idle state.

A network device successfully obtains a spectrum resource on the first bandwidth, obtains a corresponding MCOT, and performs transmission on the first bandwidth. If there is still a remaining time period in the MCOT after current transmission is ended, channel listening for the second service transmission may be started in the remaining time period. In this way, at least one service transmission (uplink transmission or downlink transmission) may be performed in the MCOT. For any new service transmission, if a corresponding second bandwidth is not greater than a first bandwidth, the transmit end device may use a non-random backoff based channel listening mechanism (for example, detecting whether a spectrum is idle within 25 µs) before performing transmission. If detecting that the corresponding spectrum on the second bandwidth is idle, the transmit end device may send a signal; or if detecting that the corresponding spectrum on the second bandwidth is not idle, the transmit end device cannot send a signal.

Figure 4:
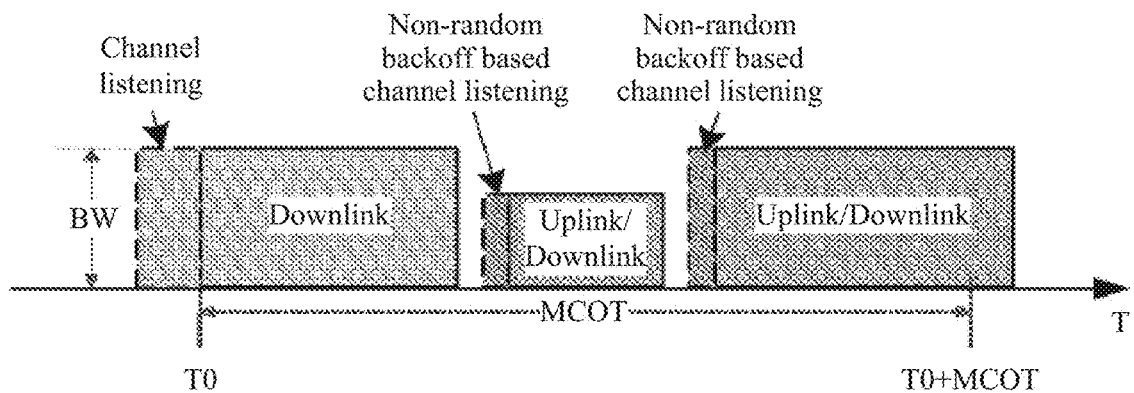
FIG. 4 is a schematic diagram of an example of channel listening.

For example, FIG. 4 is a schematic diagram of an example of channel listening. A network device detects that a spectrum on a first bandwidth BW is idle, obtains a corresponding MCOT, and starts to perform first service transmission at a moment T0. For subsequent transmission (uplink or downlink transmission), if a bandwidth is less than or equal to the BW, and the transmission is performed within a time interval between the moment T0 and a moment T0+MCOT (Herein, it is considered that the transmission time interval included in the MCOT is a sum of a time interval between downlink transmission of the network device and uplink transmission of UE scheduled by the network device, and a time interval between two times of discontinuous uplink transmission scheduled by the network device, but any time interval between two times of discontinuous downlink transmission is not included in the transmission time interval), before performing subsequent transmission, a transmit end device needs to use a non-random backoff based channel listening mechanism to detect whether a spectrum on the corresponding transmission bandwidth is idle. If the spectrum is idle, the transmit end device sends a signal; or if the spectrum is not idle, the transmit end device cannot send a signal.

S204. If a result of the comparison is that the second bandwidth is greater than the first bandwidth, the second transmit end device performs listening by using a random backoff based channel listening mechanism to determine whether the second bandwidth is in an idle state.

S205. The second transmit end device performs the second service transmission on the second bandwidth in a second specified time period if the second bandwidth is found to be in an idle state, where the second specified time period is a second MCOT obtained by the second transmit end device on the second bandwidth, where the second MCOT includes a sum of transmission time periods of all service transmission started on the second bandwidth, or the second MCOT includes a sum of transmission time periods of all service transmission started on the second bandwidth and time intervals of all discontinuous service transmission, or the second MCOT includes a sum of transmission time periods of all service transmission started on the second bandwidth and a time interval of discontinuous service transmission satisfying a specified condition.

In an embodiment, a scenario of channel listening is that after a network device obtains a channel through contention, the network device may share the channel for subsequent uplink or downlink transmission in a remaining time period of an MCOT because the network device is more competitive. The network device obtains a spectrum resource on a first bandwidth, obtains a corresponding MCOT, and performs transmission on the first bandwidth. If a plurality of times of discontinuous transmission (uplink or downlink transmission) are started in the remaining time period of the MCOT after current transmission is completed, for any new transmission, if a corresponding second bandwidth is greater than a first bandwidth, a transmit end device needs to perform random backoff based LBT before performing transmission. After successfully performing random backoff based LBT, the transmit end device obtains a new MCOT, and in this case, the previous MCOT becomes invalid.

Figure 5A:
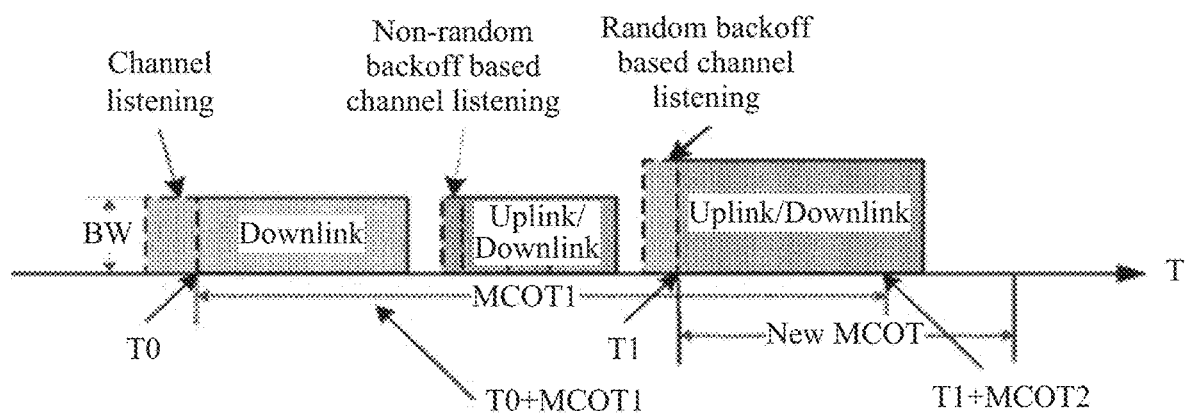
FIG. 5A is a schematic diagram of another example of channel listening.

For example, FIG. 5A shows a schematic diagram of another example of channel listening, a network device detects that a spectrum on a bandwidth BW is idle, obtains an MCOT, and starts to perform downlink transmission at a moment T0. After the downlink transmission is completed, if a bandwidth used for subsequent transmission (uplink transmission or downlink transmission) is greater than the BW, before sending a signal, a transmit end device needs to use a random backoff based channel listening mechanism to detect whether a spectrum on the corresponding transmission bandwidth is idle. If the spectrum is idle, the transmit end device obtains a second specified time period (namely, a new MCOT in the figure) and starts to send a signal; or if the spectrum is not idle, the transmit end device cannot send a signal.

In this embodiment, when the second bandwidth is less than or equal to the first bandwidth, a fast non-random backoff based channel listening mechanism is used. In this way, channel listening efficiency is improved and service transmission can be quickly performed. When the second bandwidth is greater than the first bandwidth, a random backoff based channel listening mechanism needs to be used to perform channel contention again, so as to ensure channel transmission reliability.

In another embodiment, a scenario of channel listening is that after obtaining a channel through contention, a terminal device usually shares the channel for subsequent uplink transmission in a remaining time period of T0+MCOT. The terminal device successfully obtains a spectrum resource on a first bandwidth, obtains a corresponding MCOT, and performs transmission on the first bandwidth according to an instruction. If one or more times of uplink transmission are started in the remaining time period of the MCOT after current transmission is completed, for any new subsequent service transmission, if a corresponding second bandwidth is not greater than the first bandwidth, before performing transmission, the terminal device may use a non-random backoff based LBT to detect whether a spectrum on the second bandwidth is idle; or if the corresponding second bandwidth is greater than the first bandwidth, the terminal device needs to perform Cat 4 LBT detection. After successfully performing Cat 4 LBT detection, the terminal device obtains a new MCOT, and in this case, the previous MCOT becomes invalid.

Figure 5B:
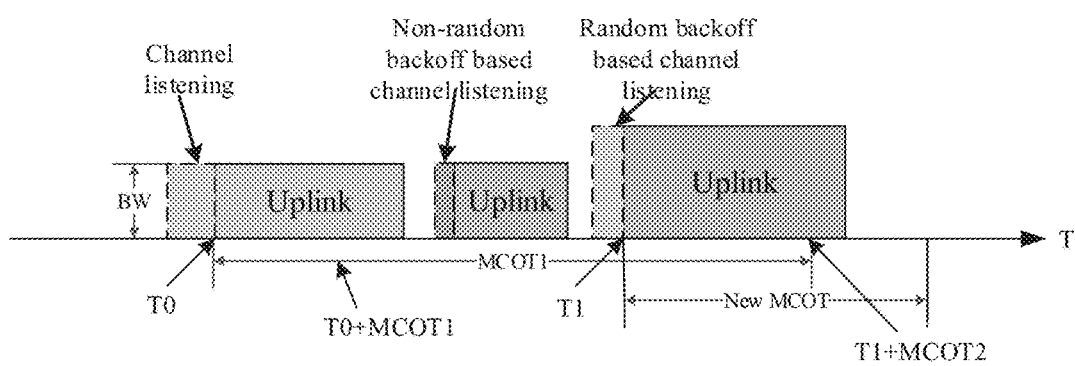
FIG. 5B is a schematic diagram of still another example of channel listening.

For example, FIG. 5B is a schematic diagram of still another example of channel listening, a terminal device detects that a spectrum on a bandwidth BW is idle, obtains a corresponding MCOT, and starts to perform uplink transmission at a moment T0. For subsequent new transmission started in a time interval between the moment T0 and a moment T0+MCOT (Herein, it is considered that the transmission time interval included in the MCOT is a sum of time intervals between two times of adjacent discontinuous uplink transmission), if a transmission bandwidth is not greater than the BW, before sending a signal, the terminal device needs to perform non-random backoff based LBT to detect whether a spectrum on the corresponding transmission bandwidth is idle. If the spectrum is idle, the terminal device may send a signal; or if the spectrum is not idle, the terminal device cannot send a signal. On the contrary, if the transmission bandwidth is greater than the BW, before sending a signal, the terminal device needs to perform random backoff based LBT to detect whether the spectrum on the corresponding transmission bandwidth is idle. If the spectrum is idle, the terminal device obtains a second specified time period (namely, a new MCOT in the figure) and starts to send a signal; or if the spectrum is not idle, the terminal device cannot send a signal.

In this embodiment, when the second bandwidth is less than or equal to the first bandwidth, a fast non-random backoff based channel listening mechanism is used. In this way, channel listening efficiency is improved and service transmission can be quickly performed. When the second bandwidth is greater than the first bandwidth, a random backoff based channel listening mechanism needs to be used to perform channel contention again, so as to ensure channel transmission reliability.

According to a channel listening method provided in this embodiment of the present disclosure, a first transmit end device obtains a first bandwidth usable within the specified time period through contention, and in respect of at least one second service transmission started in the remaining time period of the specified time period, the second transmit end device compares magnitudes of a second bandwidth carrying the second service transmission and the first bandwidth. When the second bandwidth is less than or equal to the first bandwidth, the second transmit end device uses a fast non-random backoff based channel listening mechanism, so as to improve channel listening efficiency and quickly perform service transmission. When the second bandwidth is greater than the first bandwidth, the second transmit end device uses a random backoff based channel listening mechanism to perform channel contention again, so as to ensure channel transmission reliability. In this way, corresponding channel listening mechanisms may be used depending on different bandwidths, thereby improving communication efficiency.

Figure 6:
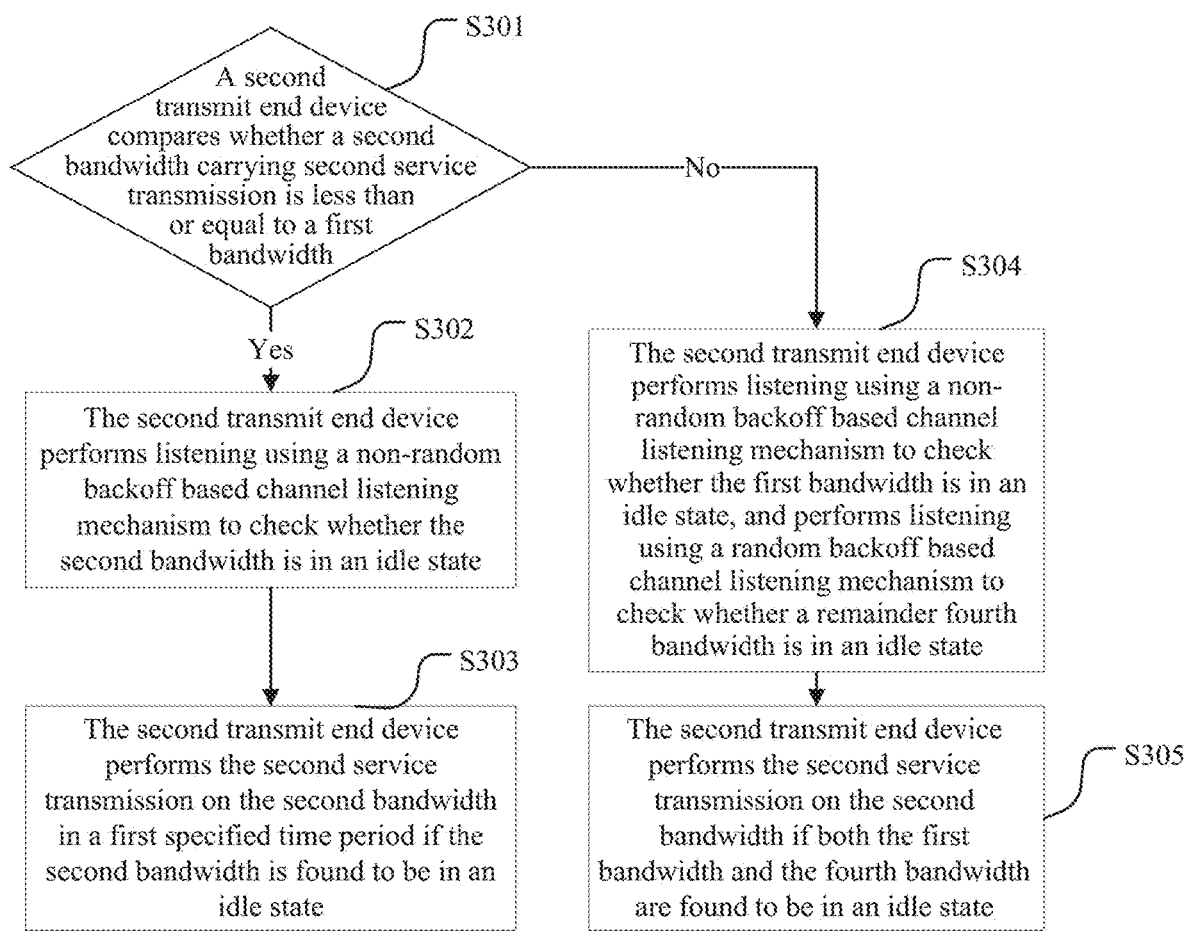
FIG. 6 is a schematic flowchart of another further detailed embodiment of the communication method provided in FIG. 2.

FIG. 6 is a schematic flowchart of another further detailed embodiment of a channel listening method provided in FIG. 2. The method may include the following steps:

S301. A second transmit end device compares whether a second bandwidth carrying second service transmission is less than or equal to a first bandwidth; and if the second bandwidth is less than or equal to the first bandwidth, perform step S302; or if the second bandwidth is greater than the first bandwidth, perform step S304.

S302. If a result of the comparison is that the second bandwidth is less than or equal to the first bandwidth, the second transmit end device performs listening by using a non-random backoff based channel listening mechanism to determine whether the second bandwidth is in an idle state.

S303. The second transmit end device performs the second service transmission on the second bandwidth if the second bandwidth is found to be in an idle state.

For an embodiment process of steps S301 to S303, refer to steps S201 and S203 of the embodiment shown in FIG. 3. Details are not described herein again.

S304. If the result of the comparison is that the second bandwidth is greater than the first bandwidth, the second transmit end device performs listening by using a non-random backoff based channel listening mechanism to determine whether the first bandwidth is in an idle state, and performs listening by using a random backoff based channel listening mechanism to determine whether a remainder fourth bandwidth is in an idle state, where the fourth bandwidth is a difference between the second bandwidth and the first bandwidth.

S305. The second transmit end device performs the second service transmission on the second bandwidth if both the first bandwidth and the fourth bandwidth are found to be in an idle state.

Assuming that a network device successfully obtains a spectrum resource on a first bandwidth, obtains a corresponding MCOT, and performs transmission on the first bandwidth, if one or more times of service transmission (uplink or downlink transmission) are started in the remaining time period of the MCOT after current transmission is ended, for each subsequent new transmission, if a corresponding second bandwidth is greater than the first bandwidth, before performing transmission, the device may perform non-random backoff based LBT on the first bandwidth to detect whether a spectrum is idle, and may perform a random backoff based LBT on a remainder fourth bandwidth (a difference obtained by subtracting the first bandwidth from the second bandwidth) to detect whether the corresponding spectrum is idle. Before a corresponding sending moment, if detecting that both the spectra on the first bandwidth and the fourth bandwidth are idle, the device may send a signal; or if detecting that neither of the spectra is idle or any of the spectra is idle, the device cannot send a signal.

Figure 7:
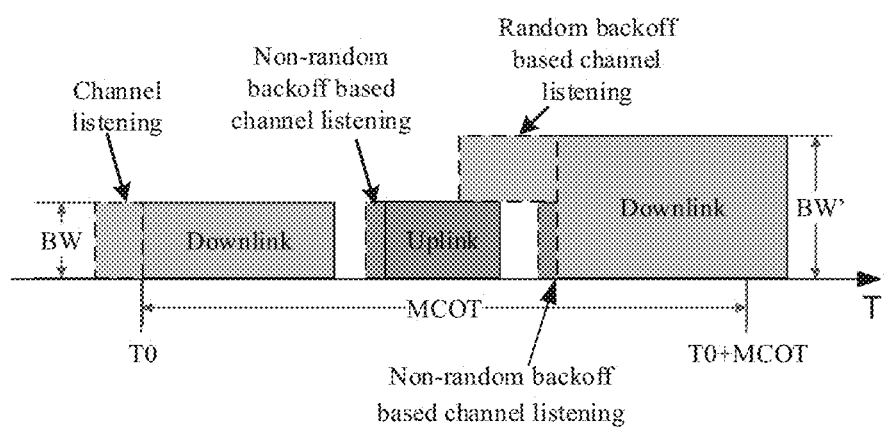
FIG. 7 is a schematic diagram of still another example of channel listening.

For example, FIG. 7 is a schematic diagram of still another example of channel listening, a network device detects that a spectrum on a bandwidth BW is idle, obtains a corresponding MCOT, and starts to perform downlink transmission at a moment T0. For subsequent new downlink transmission, if a transmission bandwidth BW' is greater than BW, the transmission is performed within the time interval between the moment T0 and a moment T0+MCOT, and preceding transmission nearest to the new downlink transmission is uplink transmission, before sending a signal, a transmit end device needs to perform non-random backoff based LBT to detect whether a spectrum on the corresponding bandwidth BW is idle, and perform random backoff based LBT to detect whether a spectrum on a bandwidth (BW'-BW) is idle. If finally detecting that the spectra on the two bandwidths are idle, the transmit end device sends a signal; or if finally detecting that neither of the spectra is idle or any of the spectra is idle, the transmit end device cannot send a signal.

It should be noted that in this embodiment, new transmission and preceding transmission nearest to the new transmission need to be transmission performed in different directions. In other words, if the new transmission is downlink transmission, the preceding transmission nearest to the new transmission should be uplink transmission; and similarly, if the new transmission is uplink transmission, the preceding transmission nearest to the new transmission should be downlink transmission. This is because only in this way, there is enough time to perform random backoff based LBT before the new service transmission is started.

According to the communication method provided in this embodiment of the present disclosure, a first transmit end device obtains a first bandwidth usable within a specified time period through contention, and in respect of at least one second service transmission started in the remaining time period of the specified time period, the second transmit end device compares magnitudes of a second bandwidth carrying the second service transmission and the first bandwidth. When the second bandwidth is less than or equal to the first bandwidth, the second transmit end device uses a fast non-random backoff based channel listening mechanism, so as to improve channel listening efficiency and quickly perform service transmission. When the second bandwidth is greater than the first bandwidth, the second transmit end device uses a random backoff based channel listening mechanism to perform channel contention again, so as to ensure channel transmission reliability. In this way, corresponding channel listening mechanisms may be used depending on different bandwidths, thereby improving communication efficiency.

Figure 8:
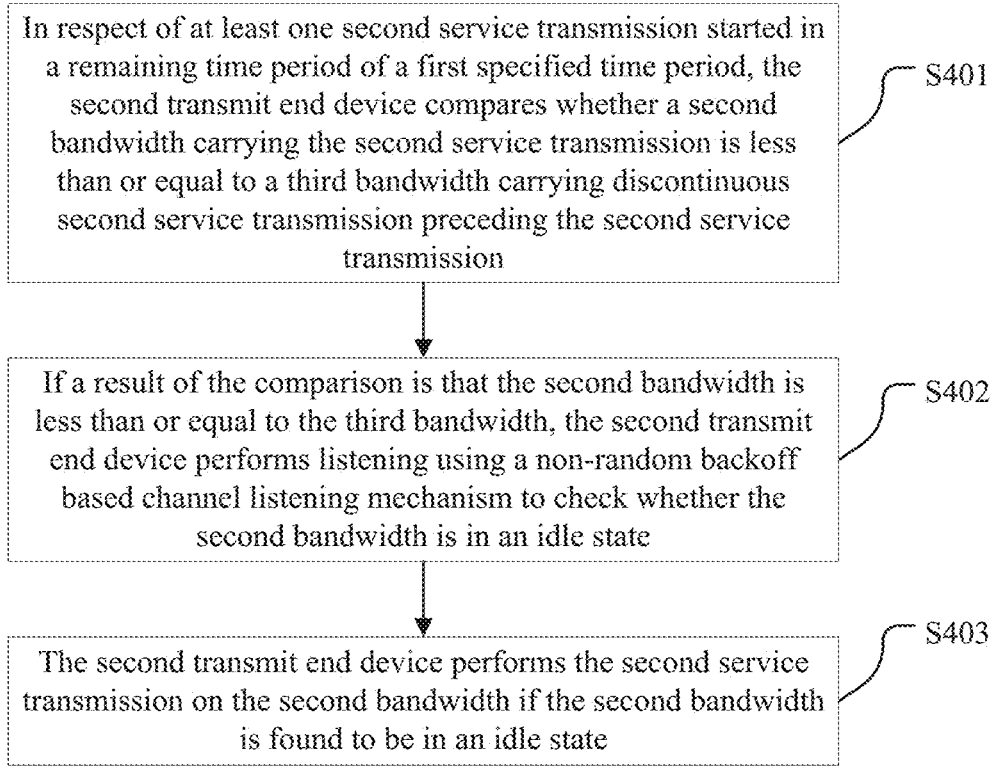
FIG. 8 is a schematic flowchart of another communication method according to an embodiment of the present disclosure.

FIG. 8 is a schematic flowchart of another communication method according to an embodiment of the present disclosure. The method may include the following steps:

S401. In respect of at least one second service transmission started in a remaining time period of a first specified time period, the second transmit end device compares whether a second bandwidth carrying the second service transmission is less than or equal to a third bandwidth carrying last discontinuous second service transmission preceding the second service transmission.

S402. If a result of the comparison is that the second bandwidth is less than or equal to the third bandwidth, the second transmit end device performs listening by using a non-random backoff based channel listening mechanism to determine whether the second bandwidth is in an idle state.

S403. The second transmit end device performs the second service transmission on the second bandwidth if the second bandwidth is found to be in an idle state.

A network device successfully obtains a spectrum resource on a first bandwidth, obtains a corresponding MCOT, and performs transmission on the first bandwidth. If one or more times of service transmission (uplink or downlink transmission) are started in the remaining time period of the first specified time period after current transmission is completed, for each subsequent new transmission, if a corresponding second bandwidth is not greater than a third bandwidth carrying last preceding transmission that is near to the new transmission, the device may perform non-random backoff based LBT (for example, detecting whether a spectrum is idle within 25 μs) before performing transmission. If detecting that the corresponding spectrum on the second bandwidth is idle, the device may send a signal; or if detecting that the corresponding spectrum on the second bandwidth is not idle, the device cannot send a signal.

Figure 9:
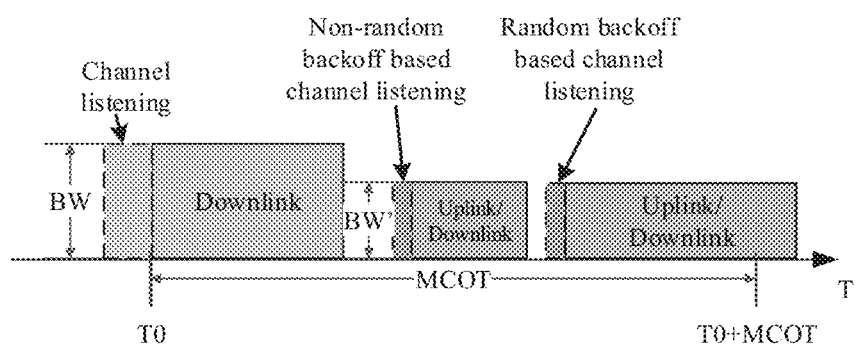
FIG. 9 is a schematic diagram of still another example of channel listening.

For example, FIG. 9 is a schematic diagram of still another example of channel listening. In FIG. 9, a network device detects that a spectrum on a bandwidth BW is idle, obtains a corresponding MCOT, and starts to perform downlink transmission at a moment T0. For subsequent transmission (uplink or downlink transmission), if a bandwidth is less than or equal to a bandwidth BW' carrying last preceding transmission, and the transmission is performed within a time interval between the moment T0 and a moment T0+MCOT (Herein, it is considered that the transmission time interval included in the MCOT includes a sum of a time interval between downlink transmission of the network device and adjacent uplink transmission of UE scheduled by the network device, and a time interval between two times of adjacent discontinuous uplink transmission scheduled by the network device, but any time interval between two times of discontinuous downlink transmission is not included in Tg), before sending a signal, a transmit end device needs to perform non-random backoff based LBT to detect whether a spectrum on the corresponding transmission bandwidth is idle. If detecting that the spectrum is idle, the transmit end device sends a signal; or if detecting that the spectrum is not idle, the transmit end device cannot send a signal.

According to the communication method provided in this embodiment of the present disclosure, a first transmit end device obtains a first bandwidth usable within a specified time period through contention, and in respect of at least one second service transmission started in the remaining time period of the specified time period, the second transmit end device compares magnitudes of a second bandwidth carrying the second service transmission and the first bandwidth. When the second bandwidth is less than or equal to the first bandwidth, the second transmit end device uses a fast non-random backoff based channel listening mechanism, so as to improve channel listening efficiency and quickly perform service transmission. When the second bandwidth is greater than the first bandwidth, the second transmit end device uses a random backoff based channel listening mechanism to perform channel contention again, so as to ensure channel transmission reliability. In this way, corresponding channel listening mechanisms may be used depending on different bandwidths, thereby improving communication efficiency.

The foregoing describes in detail the method in the embodiments of the present disclosure. The following provides an apparatus in the embodiments of the present disclosure.

Figure 10:
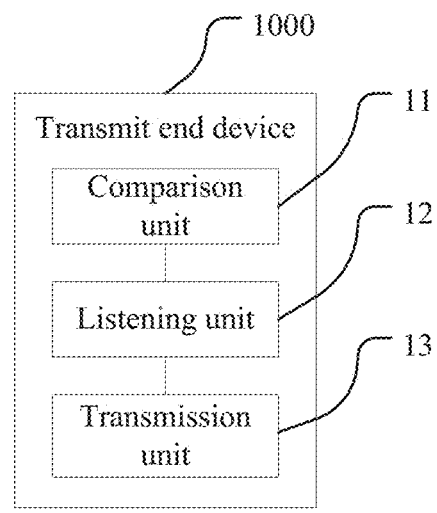
FIG. 10 is a schematic module diagram of a transmit end device according to an embodiment of the present disclosure.

FIG. 10 is a schematic module diagram of a transmit end device according to an embodiment of the present disclosure, and the transmit end device is applicable to the communications system shown in FIG. 1. The transmit end device 1000 may include a comparison unit 11, a listening unit 12, and a transmission unit 13. The comparison unit 11 is configured to compare magnitudes of a second bandwidth and a first bandwidth, for example, to perform the foregoing S101 part; the listening unit 12 is configured to listen to a channel of the second bandwidth, for example, to perform the foregoing S102 part; and the transmission unit 13 is configured to communicate with a receive end device, for example, to perform the foregoing S103 part; and perform second service transmission if the second bandwidth is in an idle state.

In an embodiment, the comparison unit 11 may be further configured to perform the foregoing S201 part; the listening unit 12 may be further configured to perform the foregoing S202 or S204 part; and the transmission unit 13 may be further configured to perform the foregoing S203 or S205 part.

In another embodiment, the comparison unit 11 may be further configured to perform the foregoing S301 part; the listening unit 12 may be further configured to perform the foregoing S302 or S304 part; and the transmission unit 13 may be further configured to perform the foregoing S303 or S305 part.

In still another embodiment, the comparison unit 11 may be further configured to perform the foregoing S401 part; the listening unit 12 may be further configured to perform the foregoing S402 part; and the transmission unit 13 may be further configured to perform the foregoing S403 part.

For details, refer to the description in the method embodiments. Details are not described herein again.

According to the transmit end device provided in this embodiment of the present disclosure, corresponding channel listening mechanisms may be used depending on different bandwidths, thereby improving communication efficiency.

Figure 11:
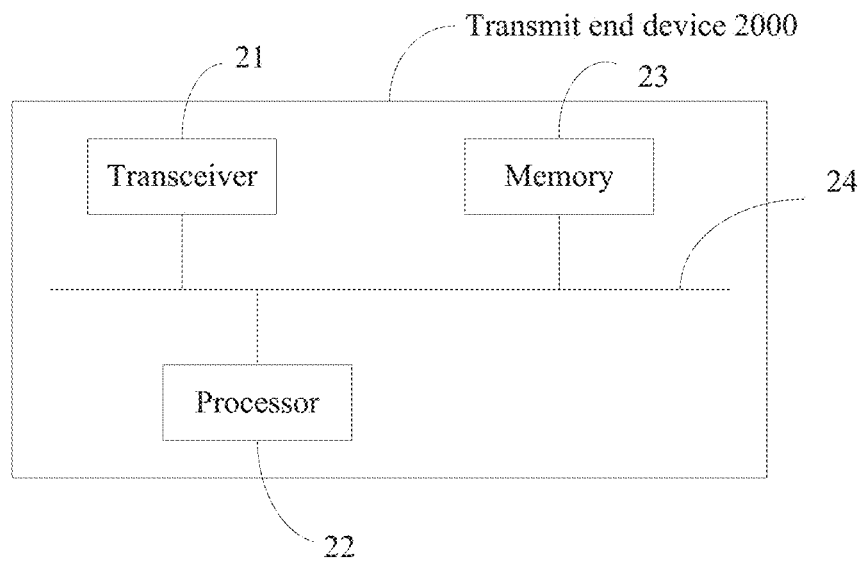
FIG. 11 is a schematic structural diagram of hardware of a transmit end device according to an embodiment of the present disclosure.

FIG. 11 is a schematic structural diagram of hardware of a transmit end device according to an embodiment of the present disclosure, and the transmit end device is applicable to the communications system shown in FIG. 1. The transmit end device 2000 may include a transceiver 21, a processor 22, and a memory 23. The transceiver 21, the processor 22, and the memory 23 are connected to each other by using a bus 24. Related functions implemented by the comparison unit 11 and the listening unit 12 in FIG. 10 may be implemented by one or more processors 22. A related function implemented by the transmission unit 13 in FIG. 10 may be implemented by the transceiver 21.

The memory 23 includes but is not limited to a random access memory (RAM), a read-only memory (ROM), an erasable programmable read only memory (EPROM), or a compact disc read-only memory (CD-ROM). The memory 23 is configured to store a related instruction and data.

The transceiver 21 is configured to send data and/or a signal and receive data and/or a signal.

The processor 22 may include one or more processors, for example, one or more central processing units (CPUs). When the processor 22 is a CPU, the CPU may be a single-core CPU, or may be a multi-core CPU.

The processor 23 is configured to support the transmit end device in performing steps S101 and S102 shown in FIG. 2, that is, compare magnitudes of a second bandwidth and a first bandwidth and listen to a channel of the second bandwidth. The memory 23 is configured to store program code and data of the transmit end device.

The transceiver 21 is configured to communicate with a receive end device, perform step S103 shown in FIG. 2, and perform second service transmission on the second bandwidth if the second bandwidth is in an idle state.

For details about steps performed by the processor 23 and the transceiver 21, refer to the description in the embodiments shown in FIG. 2 to FIG. 9. Details are not described herein again.

For details, refer to the description in the method embodiments. Details are not described herein again.

It can be understood that FIG. 11 shows merely a simplified design of the transmit end device. In actual application, when the transmit end device is a base station or a terminal device, the transmit end device may further include another necessary component. The component includes but is not limited to any quantity of transceivers, processors, controllers, memories, and communications unit, and all transmit end devices that can implement the present disclosure fall within the protection scope of the present disclosure.

According to the transmit end device provided in this embodiment of the present disclosure, corresponding channel listening mechanisms may be used depending on different bandwidths, thereby improving communication efficiency.

An embodiment of the present disclosure further provides a computer-readable storage medium. The computer-readable storage medium stores an instruction, and when the instruction is run on a computer, the computer is enabled to perform the methods described in the foregoing aspects.

An embodiment of the present disclosure further provides a computer program product including an instruction. When the instruction is run on a computer, the computer is enabled to perform the methods described in the foregoing aspects.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application. It may be clearly understood by a person skilled in the art that, for convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present disclosure are all or partially generated. The computer may be a general-purpose computer, a dedicated computer, a computer network, or another programmable apparatus. The computer instruction may be stored in a computer-readable storage medium, or may be transmitted by using the computer-readable storage medium. The computer instruction may be transmitted from a website, a computer, a server, or a data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD), or the like.

A person of ordinary skill in the art may understand that all or some of the processes of the methods in the embodiments may be implemented by a computer program instructing relevant hardware. The program may be stored in a computer-readable storage medium. When the program is executed, the processes of the method embodiments are performed. The foregoing storage medium includes various media that can store program code, such as a ROM, a random access memory RAM, a magnetic disk, or a compact disc.

The invention claimed is:

1. A communication method, comprising:
comparing, by a second transmit end device, a second bandwidth carrying at least one second service transmission and a first bandwidth, wherein the first bandwidth is used by a first transmit end device within a first specified time period on an unlicensed frequency band to complete a first service transmission, and wherein the at least one second service transmission starts in a remaining time period of the first specified time period after the first service transmission and ends in the first specified time period;
performing, by the second transmit end device, channel listening on the second bandwidth based on a result of the comparing; and
performing, by the second transmit end device, the second service transmission on the second bandwidth based on the second bandwidth being found to be in an idle state.

2. The method according to claim 1,
wherein based on the result of the comparing being that the second bandwidth is less than or equal to the first bandwidth, performing, by the second transmit end device, listening using non-random backoff based channel listening to determine whether the second bandwidth is in an idle state.

3. The method according to claim 1, wherein the method further comprises:
comparing, by the second transmit end device, whether the second bandwidth carrying the second service transmission is less than or equal to a third bandwidth carrying a last discontinuous second service transmission preceding the second service transmission;
in response to determining that a result of the comparing whether the second bandwidth is less than or equal to the third bandwidth is that the second bandwidth is less than or equal to the third bandwidth, performing, by the second transmit end device, listening using non-random backoff based channel listening to determine whether the second bandwidth is in an idle state; and
performing, by the second transmit end device, the second service transmission on the second bandwidth based on the second bandwidth being found to be in an idle state.

4. The method according to claim 1,
wherein the first specified time period is a first maximum channel occupancy time (MCOT) obtained by the first transmit end device on the first bandwidth; and
wherein the first MCOT comprises:
a sum of transmission time periods of all service transmissions started on the first bandwidth, or
a sum of transmission time periods of all service transmissions started on the first bandwidth and time intervals of all discontinuous service transmissions, or
a sum of transmission time periods of all service transmissions started on the first bandwidth and a time interval of a discontinuous service transmission satisfying a specified condition.

5. The method according to claim 1,
wherein in response to determining that the result of the comparing is that the second bandwidth is greater than the first bandwidth, performing, by the second transmit end device, listening using random backoff based channel listening to determine whether the second bandwidth is in an idle state; and
performing, by the second transmit end device, the second service transmission on the second bandwidth in a second specified time period based on the second bandwidth being found to be in an idle state,
wherein the second specified time period is a second maximum channel occupancy time (MCOT) obtained by the second transmit end device on the second bandwidth, and
wherein the second MCOT comprises:
a sum of transmission time periods of all service transmissions started on the second bandwidth, or
a sum of transmission time periods of all service transmissions started on the second bandwidth and time intervals of all discontinuous service transmissions, or
a sum of transmission time periods of all service transmissions started on the second bandwidth and a time interval of a discontinuous service transmission satisfying a specified condition.

6. The method according to claim 1, wherein the method further comprises:
in response to determining that the result of the comparing is that the second bandwidth is greater than the first bandwidth, performing, by the second transmit end device, listening using non-random backoff based channel listening to determine whether the first bandwidth is in an idle state, and performing listening using random backoff based channel listening to determine whether a remainder fourth bandwidth is in an idle state, wherein the fourth bandwidth is a difference between the second bandwidth and the first bandwidth; and
performing, by the second transmit end device, the second service transmission on the second bandwidth based on both the first bandwidth and the fourth bandwidth being found to be in an idle state.

7. The method according to claim 1, wherein
the first service transmission comprises at least one of the following types: uplink service transmission and downlink service transmission; and
the plurality of times of discontinuous second service transmission comprise at least one of the following types: uplink service transmission and downlink service transmission.

8. The method according to claim 1, wherein a length of a contention window of the random backoff based channel listening is fixed or variable.

9. A transmit end device, comprising
a transceiver; and
a processor, configured to:
compare a second bandwidth carrying at least one second service transmission and a first bandwidth, wherein the first bandwidth is used by a first transmit end device within a first specified time period on an unlicensed frequency band to complete a first service transmission, and wherein the at least one second service transmission starts in a remaining time period of the first specified time period after the first service transmission and ends in the first specified time period;
perform channel listening on the second bandwidth based on a result of the comparing; and
control the transceiver to perform the second service transmission on the second bandwidth based on the second bandwidth being found to be in an idle state.

10. The transmit end device according to claim 9, wherein based on the result of the comparing being that the second bandwidth is less than or equal to the first bandwidth, the processor is configured to perform listening using non-random backoff based channel listening to determine whether the second bandwidth is in an idle state.

11. The transmit end device according to claim 10, wherein the processor is further configured to:
compare whether the second bandwidth carrying the second service transmission is less than or equal to a third bandwidth carrying a last discontinuous second service transmission preceding the second service transmission;
in response to determining that a result of the comparing whether the second bandwidth is less than or equal to the third bandwidth is that the second bandwidth is less than or equal to the third bandwidth, perform listening using non-random backoff based channel listening to determine whether the second bandwidth is in an idle state; and
control the transceiver to perform the second service transmission on the second bandwidth based on the second bandwidth being found to be in an idle state.

12. The transmit end device according to claim 9, wherein the first specified time period is a first maximum channel occupancy time (MCOT) obtained by the first transmit end device on the first bandwidth; and
wherein the first MCOT comprises:
a sum of transmission time periods of all service transmissions started on the first bandwidth, or
a sum of transmission time periods of all service transmissions started on the first bandwidth and time intervals of all discontinuous service transmissions, or
a sum of transmission time periods of all service transmissions started on the first bandwidth and a time interval of a discontinuous service transmission satisfying a specified condition.

13. The transmit end device according to claim 9, wherein in response to determining that the result of the comparing is that the second bandwidth is greater than the first bandwidth, the processor is configured to perform listening using random backoff based channel listening to determine whether the second bandwidth is in an idle state; and
wherein the processor is further configured to control the transceiver to perform the second service transmission on the second bandwidth in a second specified time period based on the second bandwidth being found to be in an idle state,
wherein the second specified time period is a second maximum channel occupancy time (MCOT) obtained by the second transmit end device on the second bandwidth, and
wherein the second MCOT comprises:
a sum of transmission time periods of all service transmissions started on the second bandwidth, or
a sum of transmission time periods of all service transmissions started on the second bandwidth and time intervals of all discontinuous service transmissions, or
a sum of transmission time periods of all service transmissions started on the second bandwidth and a time interval of a discontinuous service transmission satisfying a specified condition.

14. The transmit end device according to claim 9, wherein the processor is further configured to:
in response to determining that the result of the comparing is that the second bandwidth is greater than the first bandwidth, perform listening using non-random backoff based channel listening to determine whether the first bandwidth is in an idle state, and perform listening using random backoff based channel listening to determine whether a remainder fourth bandwidth is in an idle state, wherein the fourth bandwidth is a difference between the second bandwidth and the first bandwidth; and
control the transceiver to perform the second service transmission on the second bandwidth based on both the first bandwidth and the fourth bandwidth being found to be in an idle state.

15. The transmit end device according to claim 9, wherein the first service transmission comprises at least one of the following types: uplink service transmission and downlink service transmission; and
the plurality of times of discontinuous second service transmission comprise at least one of the following types: uplink service transmission and downlink service transmission.

16. The transmit end device according to claim 9, wherein a length of a contention window of the random backoff based channel listening is fixed or variable.

17. A non-transitory computer-readable storage medium that stores a computer program, wherein when the computer program is executed by a computer, the computer is configured to:
compare a second bandwidth carrying at least one second service transmission and a first bandwidth, wherein the first bandwidth is used by a first transmit end device within a first specified time period on an unlicensed frequency band to complete a first service transmission, and wherein the at least one second service transmission starts in a remaining time period of the first specified time period after the first service transmission and ends in the first specified time period;
perform channel listening on the second bandwidth based on a result of the comparing; and
control a transceiver to perform the second service transmission on the second bandwidth based on the second bandwidth being found to be in an idle state.

18. The non-transitory computer-readable storage medium according to claim 17,
wherein based on the result of the comparing being that the second bandwidth is less than or equal to the first bandwidth, executing the computer program further causes the computer to perform listening using non-random backoff based channel listening to determine whether the second bandwidth is in an idle state.

19. The non-transitory computer-readable storage medium according to claim 18, wherein executing the computer program further causes the computer to:
compare whether the second bandwidth carrying the second service transmission is less than or equal to a third bandwidth carrying a last discontinuous second service transmission preceding the second service transmission;

in response to determining that a result of the comparing whether the second bandwidth is less than or equal to the third bandwidth is that the second bandwidth is less than or equal to the third bandwidth, perform listening using non-random backoff based channel listening to determine whether the second bandwidth is in an idle state; and control the transceiver to perform the second service transmission on the second bandwidth based on the second bandwidth being found to be in an idle state.

20. The non-transitory computer-readable storage medium according to claim 17, wherein the first specified time period is a first maximum channel occupancy time (MCOT) obtained by the first transmit end device on the first bandwidth; and wherein the first MCOT comprises:

a sum of transmission time periods of all service transmissions started on the first bandwidth, or a sum of transmission time periods of all service transmissions started on the first bandwidth and time intervals of all discontinuous service transmissions, or a sum of transmission time periods of all service transmissions started on the first bandwidth and a time interval of a discontinuous service transmission satisfying a specified condition.

* * * * *